United States Patent
Numata et al.

(10) Patent No.: US 9,361,671 B2
(45) Date of Patent: Jun. 7, 2016

(54) IMAGE PROCESSING APPARATUS, IMAGE PROCESSING METHOD, AND PROGRAM

(71) Applicant: SONY CORPORATION, Tokyo (JP)

(72) Inventors: Satoshi Numata, Tokyo (JP); Hiroaki Ebi, Tokyo (JP); Akira Tokuse, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/482,089

(22) Filed: Sep. 10, 2014

(65) Prior Publication Data
US 2015/0092087 A1 Apr. 2, 2015

(30) Foreign Application Priority Data

Sep. 27, 2013 (JP) ................................. 2013-202439

(51) Int. Cl.
*G06T 5/00* (2006.01)
*H04N 5/232* (2006.01)
*H04N 5/217* (2011.01)

(52) U.S. Cl.
CPC ................ *G06T 5/002* (2013.01); *H04N 5/217* (2013.01); *H04N 5/23219* (2013.01); *G06T 2207/20012* (2013.01); *G06T 2207/30201* (2013.01); *H04N 5/23229* (2013.01)

(58) Field of Classification Search
CPC ........... G06T 5/00–5/005; G06T 7/004–7/008; H04N 5/21–5/217; H04N 5/2173; H04N 5/2176; H04N 5/2178; H04N 5/2622; H04N 5/357; H04N 5/361–5/3658
See application file for complete search history.

(56) References Cited

U.S. PATENT DOCUMENTS

| 2009/0185049 A1* | 7/2009 | Takahashi | H04N 1/62 348/222.1 |
| 2013/0050529 A1* | 2/2013 | Murayama | H04N 5/3572 348/234 |

FOREIGN PATENT DOCUMENTS

JP 4666179 B2 4/2011

* cited by examiner

*Primary Examiner* — Paul Berardesca
(74) *Attorney, Agent, or Firm* — Chip Law Group

(57) ABSTRACT

According to an embodiment of the present disclosure, there is provided an image processing apparatus including a detection unit, a strength determination unit, and a processor. The detection unit is configured to detect at least one area in an image. The strength determination unit is configured to determine strength of processing for a unit of processing of the image, based on a distance between a location of the area being detected by the detection unit and a location of the unit of processing of the image. The processor is configured to perform the processing on the image, per the unit of processing, at the strength being determined by the strength determination unit.

10 Claims, 14 Drawing Sheets

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP2013-202439 filed Sep. 27, 2013, the entire contents of which are incorporated herein by reference.

BACKGROUND

Field of the Invention

The present disclosure relates to image processing apparatuses, image processing methods, and programs and, in particular, to an image processing apparatus, an image processing method, and a program capable of processing an image at suitable strength corresponding to a distance from a given area in the image.

Examples of processing to improve image quality include noise-reduction processing. Regarding noise-reduction processing, many techniques such as a method of optimizing a shape of a filter and a method of isolating edges and noises have been worked out. Further, a technique for removing wrinkles and spots of a face area in an image while preventing deterioration in resolution of background image, by performing noise-reduction processing on a frequency range based on the size of the face area, has been worked out (see Japanese Patent No. 4666179).

SUMMARY

Meanwhile, independently from frequency component or hue, there are some areas for which a person can be sensitive to image quality. For example, people are usually not so sensitive to image quality of clothes but are likely to be sensitive to that of faces.

Accordingly, there is a demand for performing processing such as noise-reduction of an image at suitable strength corresponding to a distance from a given area in the image.

In view of the above circumstances, it is desirable to make it possible to process an image at suitable strength corresponding to a distance from a given area in the image.

According to an embodiment of the present disclosure, there is provided an image processing apparatus including a detection unit, a strength determination unit, and a processor. The detection unit is configured to detect at least one area in an image. The strength determination unit is configured to determine strength of processing for a unit of processing of the image, based on a distance between a location of the area being detected by the detection unit and a location of the unit of processing of the image. The processor is configured to perform the processing on the image, per the unit of processing, at the strength being determined by the strength determination unit.

According to some embodiments of the present disclosure, there are provided an image processing method and a program corresponding to the image processing apparatus of the embodiment of the present disclosure.

According to an embodiment of the present disclosure, at least one area in an image is detected. Strength of processing for a unit of processing of the image is determined based on a distance between a location of the area being detected by the detection unit and a location of the unit of processing of the image. The processing on the image is performed per the unit of processing, at the strength being determined by the strength determination unit.

According to an embodiment of the present disclosure, it enables to process an image. Further, an embodiment of the present disclosure makes it possible to process the image at suitable strength corresponding to a distance from a given area in the image.

It should be noted that the effects described herein are non-limitative examples. For example, any one of the effects described herein may be an effect according to an embodiment of the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

First Embodiment (Configuration Example of Embodiment of Image Processing Apparatus)

Figure 1:
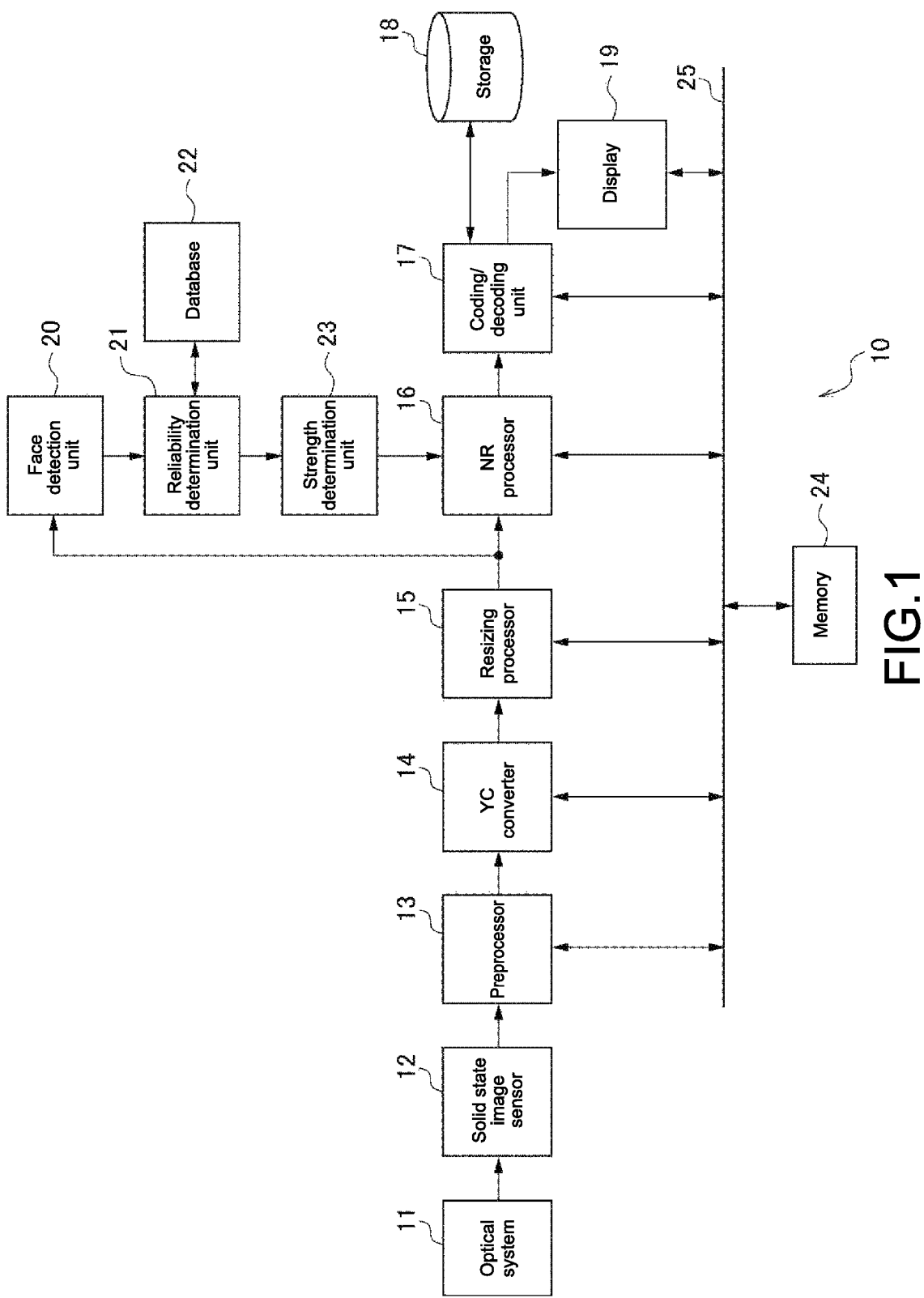
FIG. 1 is a block diagram showing a configuration example of an embodiment of an image processing apparatus to which the present disclosure is applied.

FIG. 1 is a block diagram showing a configuration example of an embodiment of an image processing apparatus to which the present disclosure is applied.

An image processing apparatus 10 of FIG. 1 has an optical system 11, a solid state image sensor 12, a preprocessor 13, a YC converter 14, a resizing processor 15, a NR processor 16, a coding/decoding unit 17, storage 18, a display 19 and a face detection unit 20. The image processing apparatus 10 further has a reliability determination unit 21, a database 22, a strength determination unit 23, a memory 24 and a bus 25.

The preprocessor 13, the YC converter 14, the resizing processor 15, the NR processor 16, the coding/decoding unit 17, the display 19 and the memory 24 are mutually connected via the bus 25. The image processing apparatus 10 takes an image and performs noise-reduction processing on the image.

Specifically, the optical system 11 of the image processing apparatus 10 includes a group of lenses and the like. The optical system 11 takes in incident light from a subject, and forms an image onto an imaging surface of the solid state image sensor 12.

The solid state image sensor 12 may include a CMOS (Complementary Metal Oxide Semiconductor) image sensor, CCD (Charge Coupled Device) image sensor, or the like. The solid state image sensor 12 performs imaging by accumulating, in each pixel, electric charges depending on the amount of the incident light imaged onto the imaging surface by the optical system 11. The solid state image sensor 12 provides, as pixel signals, analog signals of the electric charges that have been accumulated to the respective pixels as a result of imaging, to the preprocessor 13.

The preprocessor 13 performs preprocessing such as A/D conversion and demosaicing on the pixel signals provided from the solid state image sensor 12, to generate image RGB signals. The preprocessor 13 provides the image RGB signals to the YC converter 14.

The YC converter 14 converts the image RGB signals provided from the preprocessor 13 into YCbCr signals, and provides the YCbCr signals to the resizing processor 15.

The resizing processor 15 modifies the size of the image (YCbCr signals) provided from the YC converter 14 into a predetermined size, and provides the image to the NR processor 16 and the face detection unit 20.

The NR processor 16 performs noise-reduction processing on the image being provided from the resizing processor 15, per pixel, at the strength of processing being provided from the strength determination unit 23. The NR processor 16 provides the image after noise-reduction processing to the coding/decoding unit 17 and provides it also via the bus 25 to the display 19.

The coding/decoding unit 17 encodes the image provided from the NR processor 16 and provides the resulting coded data to the storage 18. The coding/decoding unit 17 also decodes the coded data read out from the storage 18, to produce an image. The coding/decoding unit 17 provides the produced image to the display 19.

The storage 18 stores the coded data provided from the coding/decoding unit 17. The storage 18 also reads out the stored coded data, and provides the data to the coding/decoding unit 17.

The display 19 displays the image being provided via the bus 25 from the NR processor 16 and the image being provided from the coding/decoding unit 17.

The face detection unit 20 detects a face area in the image provided from the resizing processor 15. Specifically, for example, names of people, animals, and the like, and images of the faces of these people, animals, and the like may be recorded beforehand for the face detection unit 20. The face detection unit 20 may detect, as the face area, a square-shaped area which contains the face, which face is obtained by performing matching between the image obtained from the resizing processor 15 and the images of the faces having been recorded. The face detection unit 20 provides, as face data, a location of the center of the detected face area on the image, a size of the face area, and the name corresponding to the face contained in the face area, to the reliability determination unit 21.

The reliability determination unit 21 registers the face data being provided from the face detection unit 20 into a reliability table that the reliability determination unit 21 keeps. The reliability determination unit 21 updates a count table recorded in the database 22, based on the face data provided from the face detection unit 20, which count table associates a name corresponding to the face area and a count value corresponding thereto. Further, the reliability determination unit 21 reads out the count table recorded in the database 22. The reliability determination unit 21 normalizes the count value corresponding to each face area for the name in the count table, to determine reliability of the face area. Note that, in this embodiment, the reliability may be a value of 0 or more and 1 or less.

The reliability determination unit 21 registers the reliability corresponding to the face data, in association with the face data recorded in the reliability table. The reliability determination unit 21 provides the face data and the reliability, which are recorded in the reliability table, to the strength determination unit 23.

The strength determination unit 23 determines the strength of noise-reduction processing for each pixel as the unit of processing of the noise-reduction, based on the reliability and the face data being provided from the reliability determination unit 21. The strength determination unit 23 provides the determined strength to the NR processing unit 16.

The memory 24 holds as necessary some halfway results, final results, and the like, which may be obtained from the processing of the preprocessor 13, the YC converter 14, the resizing processor 15, the NR processor 16, the coding/decoding unit 17 and the display 19.

(Description of Face Data)

Figure 2:
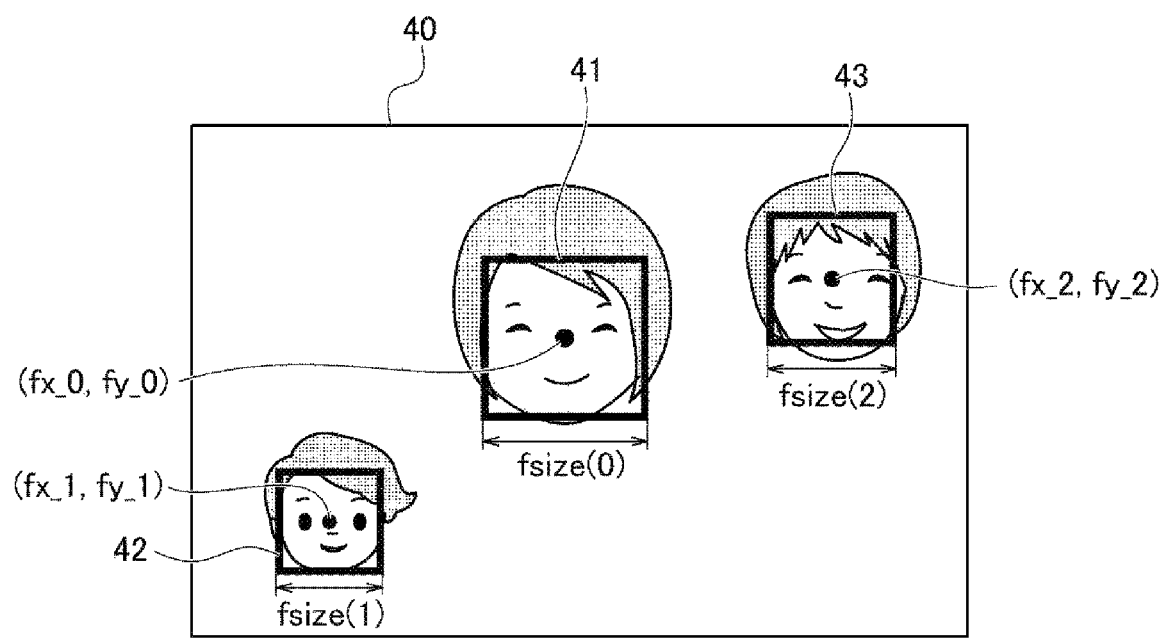
FIG. 2 is a figure describing face data.

FIG. 2 describes face data.

The example of FIG. 2 includes three face areas 41 to 43 in an image 40. In this case, the location of the center of the face area on the image (fx_0, fy_0), the length of one side of the face area fsize(0) as the size of the face area, and the name "person A" corresponding to the face contained in the face area 41, are generated as the face data of the face area 41.

Meanwhile, the location of the center of the face area on the image (fx_1, fy_1), the length of one side of the face area fsize(1) as the size of the face area, and the name "person B" corresponding to the face contained in the face area 42, are generated as the face data of the face area 42.

Further, the location of the center of the face area on the image (fx_2, fy_2), the length of one side of the face area fsize(2) as the size of the face area, and the name "person C" corresponding to the face contained in the face area 43, are generated as the face data of the face area 43.

(Description of Method of Determining Reliability)

FIGS. 3 to 7 are diagrams for describing a method of determining reliability.

Figure 3:
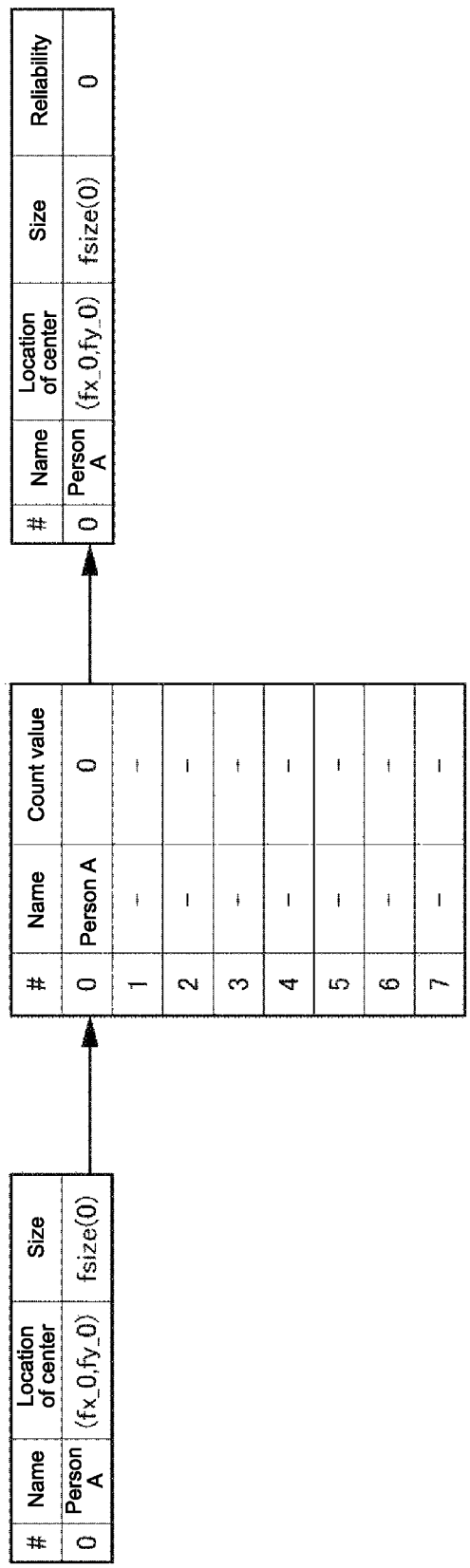
FIG. 3 is a diagram describing a method of determining reliability.

First, if the face detection unit 20 detects the face area 41 for the first time, the face data of the face area 41 as shown in the left part of FIG. 3 would be generated. Then, as shown in the right part of FIG. 3, the reliability determination unit 21 registers the face data of the face area 41 in the reliability table.

Further, as shown in the center of FIG. 3, the reliability determination unit 21 registers the name "person A" contained in the face data of the face area 41, into the count table, and also registers an initial value of "0" as the count value in association with the name "person A". Then, on the basis of the count table where the name "person A" and the count value "0" are associated with each other, the reliability determination unit 21 determines the normalized value of "0", which is obtained by normalizing the count value of "0", as the reliability of the face area 41. The reliability determination unit 21 registers the reliability "0" in association with the name "person A" in the reliability table, as shown in the right part of FIG. 3.

Figure 4:
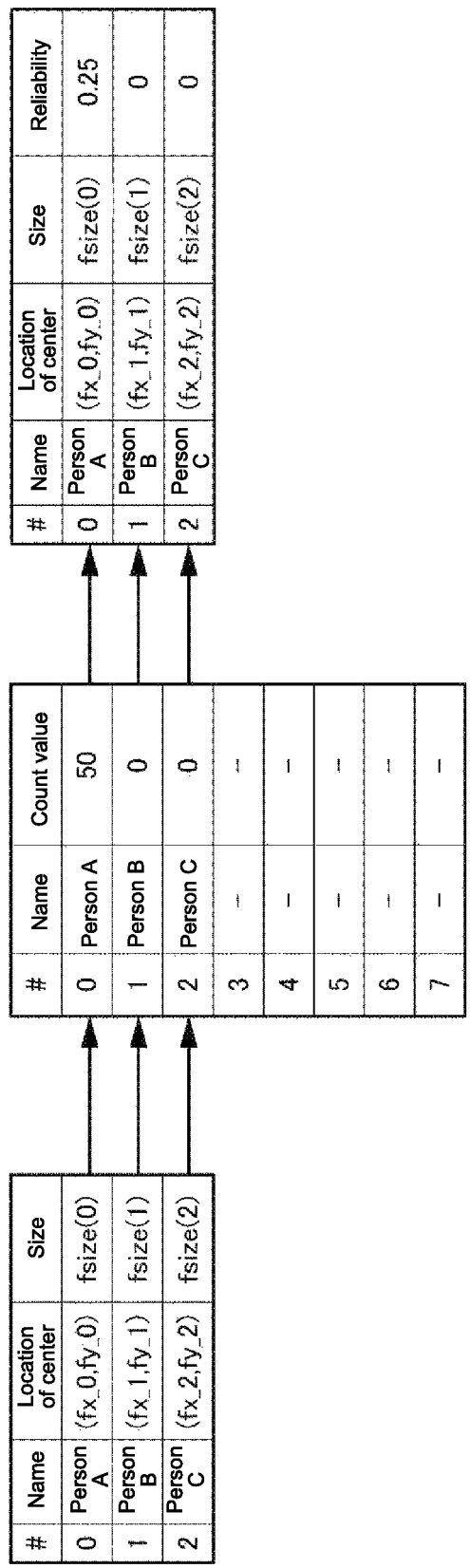
FIG. 4 is a diagram describing the method of determining reliability.

Next, if the face detection unit 20 detects the face area 41 again and detects the face areas 42 and 43 for the first time, the face data of the face areas 41 to 43 as shown in the left part of FIG. 4 would be generated. Then, as shown in the right part of FIG. 4, the reliability determination unit 21 updates the face data of the face area 41 recorded in the reliability table, and registers the face data of the face areas 42 and 43 in the reliability table.

Further, as shown in the center of FIG. 4, the reliability determination unit 21 registers the names "person B" and "person C" contained in the face data of the respective face areas 42 and 43, into the count table, and also registers an initial value of "0" as the count value in association with each of the names. The reliability determination unit 21 also increments the count value by 50, for the count value corresponding to the name "person A" of the face area 41 being detected again, which count value is recorded in the count table, and raises this count value to 50.

Then, on the basis of the count table where the name "person A" and the count value "50" are associated with each other, the reliability determination unit 21 determines the normalized value of "0.25", which is obtained by normalizing the count value of "50", as the reliability of the face area 41. The reliability determination unit 21 registers the reliability "0.25" in association with the name "person A" in the reliability table, as shown in the right part of FIG. 4.

Meanwhile, on the basis of the count table where the names "person B" and "person C" and the count values of "0" are associated with each other, the reliability determination unit 21 determines the normalized value of "0", which is obtained by normalizing the count value of "0", as the reliability of the face areas 42 and 43. The reliability determination unit 21 registers the reliability "0" in association with each of the names "person B" and "person C" in the reliability table, as shown in the right part of FIG. 4.

Figure 5:
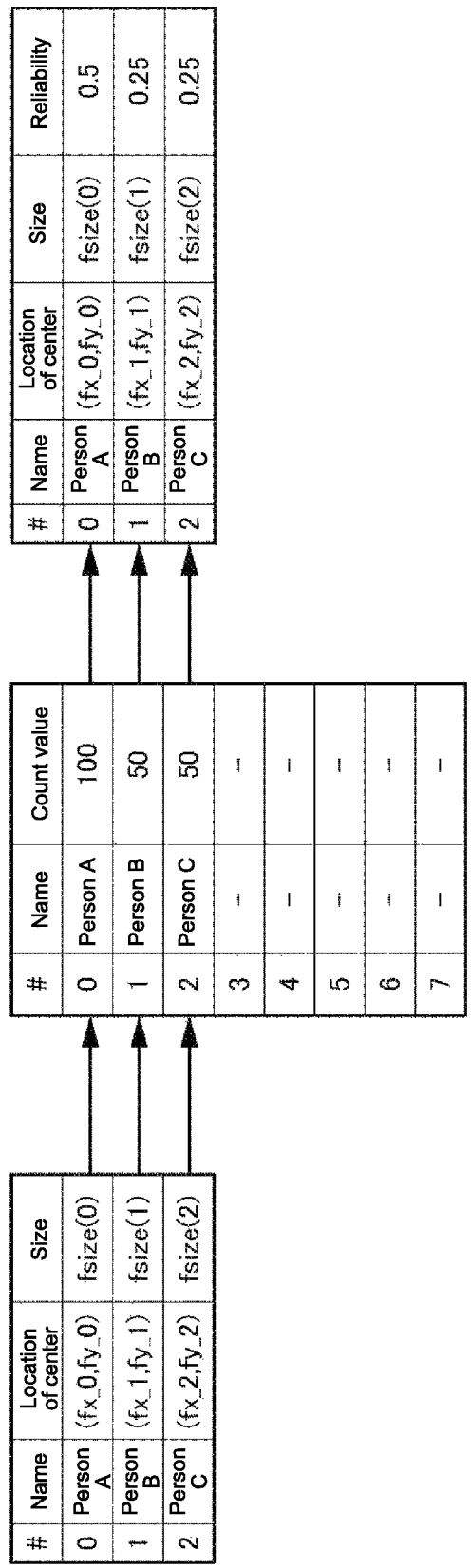
FIG. 5 is a diagram describing the method of determining reliability.

Next, if the face detection unit 20 detects the face areas 41 to 43 again, the face data of the face areas 41 to 43 as shown in the left part of FIG. 5 would be generated. Then, as shown in the right part of FIG. 5, the reliability determination unit 21 updates the face data of the face areas 41 to 43 recorded in the reliability table.

Further, as shown in the center of FIG. 5, the reliability determination unit 21 increments the count value by 50, for the count value corresponding to the name "person A" of the face area 41 being detected again, which count value is recorded in the count table, and raises this count value to 100. Meanwhile, the reliability determination unit 21 also increments the count values by 50, for the count values corresponding to the names "person B" and "person C" of the respective face areas 42 and 43 being detected again, which count values are recorded in the count table, and raises these count values to 50.

Then, on the basis of the count table where the name "person A" and the count value "100" are associated with each other, the reliability determination unit 21 determines the normalized value of "0.5", which is obtained by normalizing the count value of "100", as the reliability of the face area 41. The reliability determination unit 21 registers the reliability "0.5" in association with the name "person A" in the reliability table, as shown in the right part of FIG. 5.

Meanwhile, on the basis of the count table where the names "person B" and "person C" and the count values of "50" are associated with each other, the reliability determination unit 21 determines the normalized value of "0.25", which is obtained by normalizing the count value of "50", as the reliability of the face areas 42 and 43. The reliability determination unit 21 registers the reliability "0.25" in association with each of the names "person B" and "person C" in the reliability table, as shown in the right part of FIG. 5.

Figure 6:
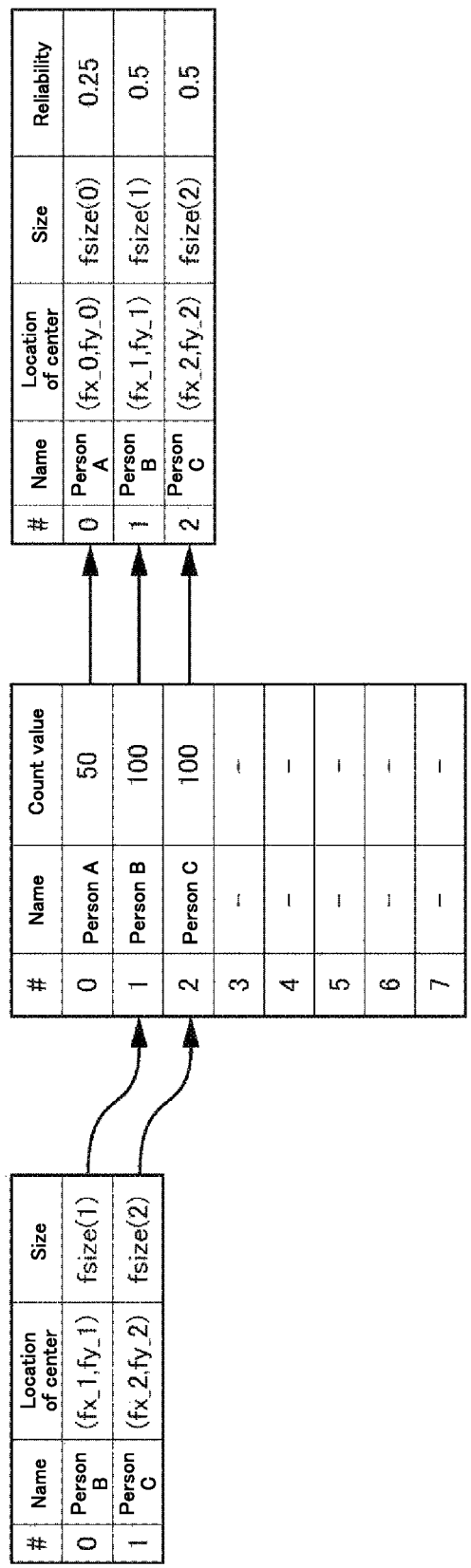
FIG. 6 is a diagram describing the method of determining reliability.

Next, if the face detection unit 20 detects the face areas 42 and 43 again but does not detect the face area 41 this time, the face data of the face areas 42 and 43 as shown in the left part of FIG. 6 would be generated. Then, as shown in the right part of FIG. 6, the reliability determination unit 21 updates the face data of the face areas 42 and 43 recorded in the reliability table.

Further, as shown in the center of FIG. 6, the reliability determination unit 21 decrements the count value by 50, for the count value corresponding to the name "person A" of the face area 41 that is not detected this time, which count value is recorded in the count table, and lowers this count value to 50. Meanwhile, the reliability determination unit 21 increments the count values by 50, for the count values corresponding to the names "person B" and "person C" of the respective face areas 42 and 43 being detected again, which count values are recorded in the count table, and raises these count values to 100.

Then, on the basis of the count table where the name "person A" and the count value "50" are associated with each other, the reliability determination unit 21 determines the normalized value of "0.25", which is obtained by normalizing the count value of "50", as the reliability of the face area 41. The reliability determination unit 21 registers the reliability "0.25" in association with the name "person A" in the reliability table, as shown in the right part of FIG. 6.

Meanwhile, on the basis of the count table where the names "person B" and "person C" and the count values of "100" are associated with each other, the reliability determination unit 21 determines the normalized value of "0.5", which is obtained by normalizing the count value of "100", as the reliability of the face areas 42 and 43. The reliability determination unit 21 registers the reliability "0.5" in association with each of the names "person B" and "person C" in the reliability table, as shown in the right part of FIG. 6.

Figure 7:
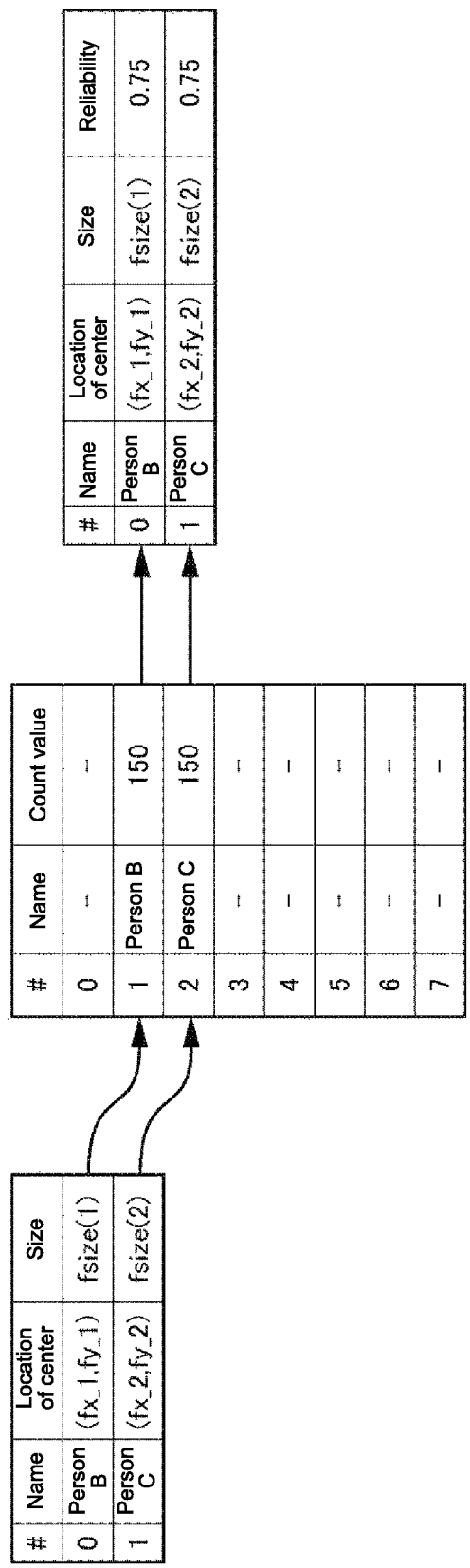
FIG. 7 is a diagram describing the method of determining reliability.

Next, if the face detection unit 20 detects the face areas 42 and 43 again and does not detect the face area 41 this time as well, the face data of the face areas 42 and 43 as shown in the left part of FIG. 7 would be generated. Then, as shown in the right part of FIG. 7, the reliability determination unit 21 updates the face data of the face areas 42 and 43 recorded in the reliability table.

Further, as shown in the center of FIG. 7, the reliability determination unit 21 decrements the count value by 50, for the count value corresponding to the name "person A" of the face area 41 that is not detected again, which count is recorded in the reliability table, and lowers this count value to 0. Then, the reliability determination unit 21 deletes the name "person A" in which the count value has become 0, and deletes its count value, from the count table. The reliability determination unit 21 also deletes the name "person A", the corresponding face data, and the corresponding reliability, from the reliability table.

Meanwhile, the reliability determination unit 21 increments the count values by 50, for the count values corresponding to the names "person B" and "person C" of the respective face areas 42 and 43 being detected again, which count values are recorded in the count table, and raises these count values to 150.

Then, on the basis of the count table where the names "person B" and "person C" and the count values of "150" are associated with each other, the reliability determination unit 21 determines the normalized value of "0.75", which is obtained by normalizing the count value of "150", as the reliability of the face areas 42 and 43. The reliability determination unit 21 registers the reliability "0.75" in association with each of the names "person B" and "person C" in the reliability table, as shown in the right part of FIG. 7.

As described above, every time the reliability determination unit 21 is provided with the face data from the face detection unit 20, the reliability determination unit 21 increments the count value corresponding to that face data in the count table. Every time the face data corresponding to the face area that has been previously detected by the face detection 20 is not provided, the reliability determination unit 21 decrements the count value corresponding to that face data in the count table. Further, the reliability determination unit 21 determines the reliability by normalizing the count value which is greater than 0. That is, the reliability determination unit 21 determines the reliability on the basis of a history of detection of the face area. Thus, even when the face area is no longer detected, the reliability may be determined during a given period of time.

Note that, although the maximum number of names that can be registered in the count table is eight, the maximum number of names that can be registered in the count table is, of course, not limited to eight.

(Example of Temporal Changes of Reliability)

Figure 8:
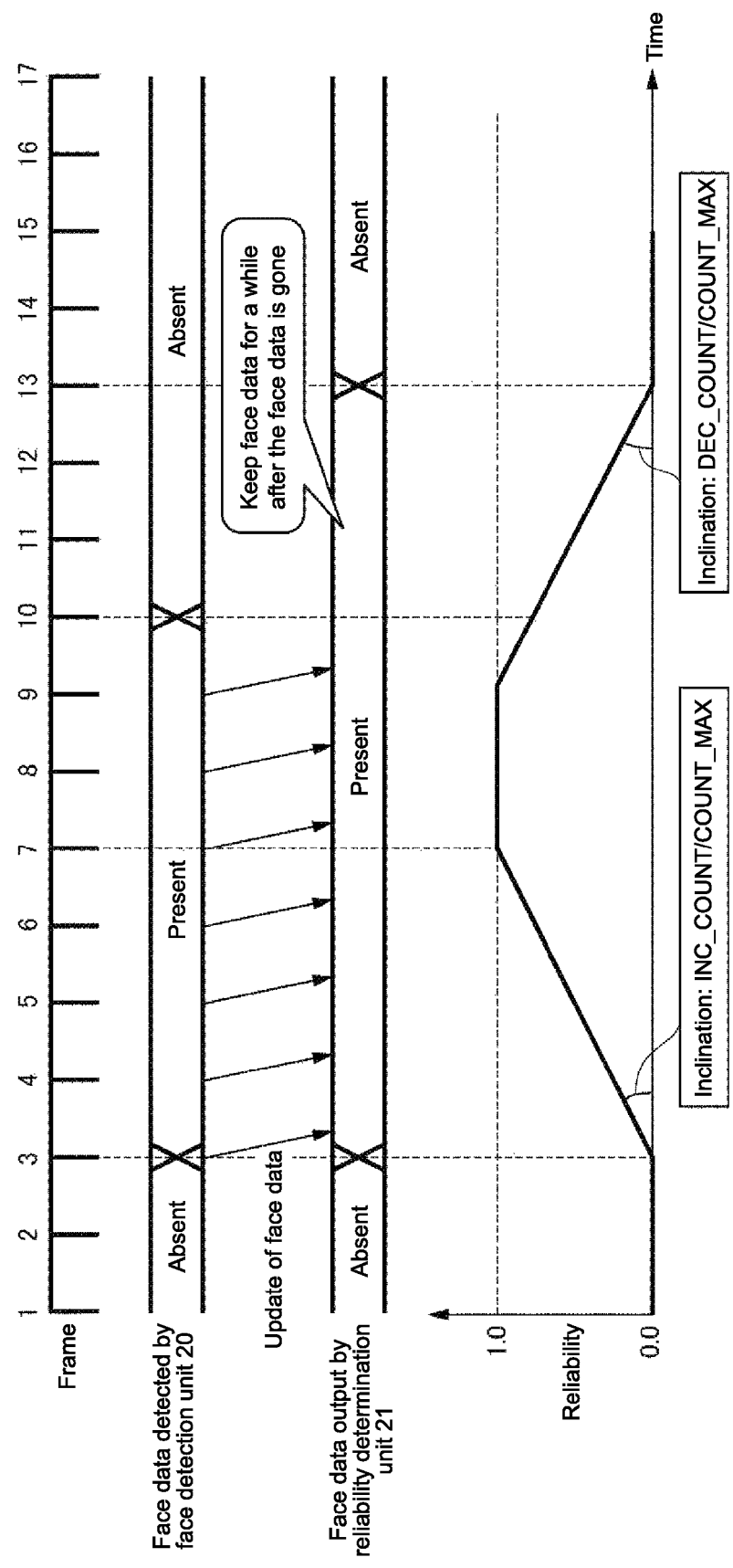
FIG. 8 shows an example of temporal changes of reliability.

FIG. 8 shows an example of temporal changes of reliability.

Note that the abscissa in FIG. 8 indicates time.

As shown in FIG. 8, upon detecting a face area in an image of the third frame from the start, the face data is output from the face detection unit 20. This allows the face data to be output from the reliability determination unit 21, and the value of 0 as the reliability is also output.

Similarly, upon detecting the face area also in an image of the fourth frame from the start and the latter ones, the face data is output from the face detection unit 20. This allows the face data to be output from the reliability determination unit 21, and the value incremented by a given value (i.e., 0.25 in this embodiment) per frame is output as the reliability.

This given value is expressed by "INC_COUNT/COUNT_MAX", provided that the maximum value of the reliability is "INC_COUNT" and the number of frames from the frame of the minimum value of the reliability to the frame of the maximum value of the reliability is "COUNT_MAX".

Upon detecting the face area in an image of the seventh frame from the start and when the reliability reaches the value of 1 which is the maximum value, even when the face area is detected in the images of the latter frames, the reliability is kept to the value of 1, with no more increments.

Then, at the tenth frame from the start, when the face area is no longer detected in the image and the face data is no longer output from the face detection unit 20, the reliability becomes decremented for a given value (i.e., 0.25 in this embodiment), while the face data and the reliability is output from the reliability determination unit 21. This given value is expressed by "DEC_COUNT/COUNT_MAX", provided that the maximum value of the reliability is "DEC_COUNT" and the number of frames from the frame of the maximum value of the reliability to the frame of the minimum value of the reliability is "COUNT_MAX".

Similarly at the eleventh frame from the start and the latter ones, when the face area is not detected and the face data is not output from the face detection unit 20, the reliability is decremented by a given value (i.e., 0.25 in this embodiment) per frame, and those reliability and face data are output from the reliability determination unit 21.

Then, at the thirteenth frame from the start, when the face area is not detected and the reliability becomes the value of 0 which is the minimum value, the reliability would be kept to the value of 0 with no decrements, and there would be no output of the reliability and the face data from the reliability determination unit 21, until the face area is detected again.

As described above, although the detection of the face area is ended at the image of the tenth frame from the start, the reliability is determined as a value of other than 0, and the reliability and face data are output from the reliability determination unit 21, for the frames up to the twelfth frame from the start.

(Configuration Example of Strength Determination Unit)

Figure 9:
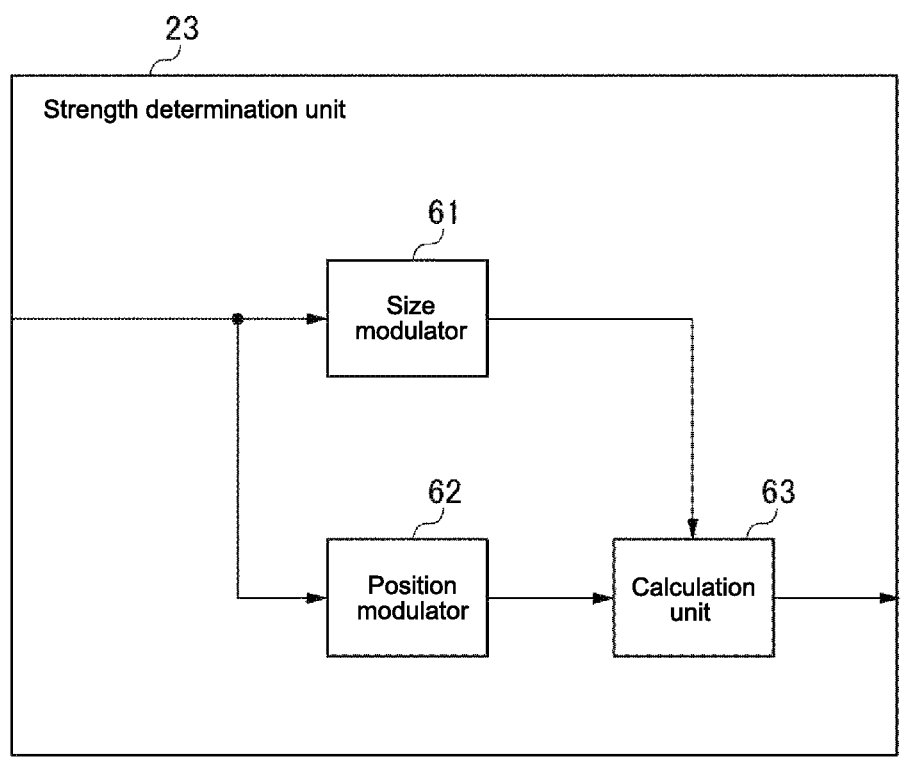
FIG. 9 is a block diagram showing a configuration example of a strength determination unit.

FIG. 9 is a block diagram showing a configuration example of the strength determination unit 23 of FIG. 1.

The strength determination unit 23 of FIG. 9 includes a size modulator 61, a position modulator 62 and a calculation unit 63.

The size modulator 61 of the strength determination unit 23 modifies the reliability provided from the reliability determination unit 21 of FIG. 1, per face area, on the basis of a size of the face area which is contained in the face data provided from the reliability determination unit 21. The size modulator 61 provides the modified reliability for each face area to the calculation unit 63.

The position modulator 62 calculates a distance between a location of the center of the face area on the image and a location of each pixel, per face area, on the basis of the location of the center of the face area contained in the face data provided from the reliability determination unit 21. The position modulator 62 modifies the reliability provided from the reliability determination unit 21, per face area and per pixel, on the basis of the calculated distance. The position modulator 62 provides the modified reliability per face area and per pixel, to the calculation unit 63.

The calculation unit 63 multiplies the reliability provided from the size modulator 61 by the reliability of each pixel provided from the position modulator 62, per face area. The calculation unit 63 determines the largest value obtained by multiplication, among the values obtained by multiplication for the respective face areas, as the strength of processing, per pixel. The calculation unit 63 then provides the strength to the NR processor 16 of FIG. 1.

(Description of Modification of Reliability by Size Modulator)

Figure 10:
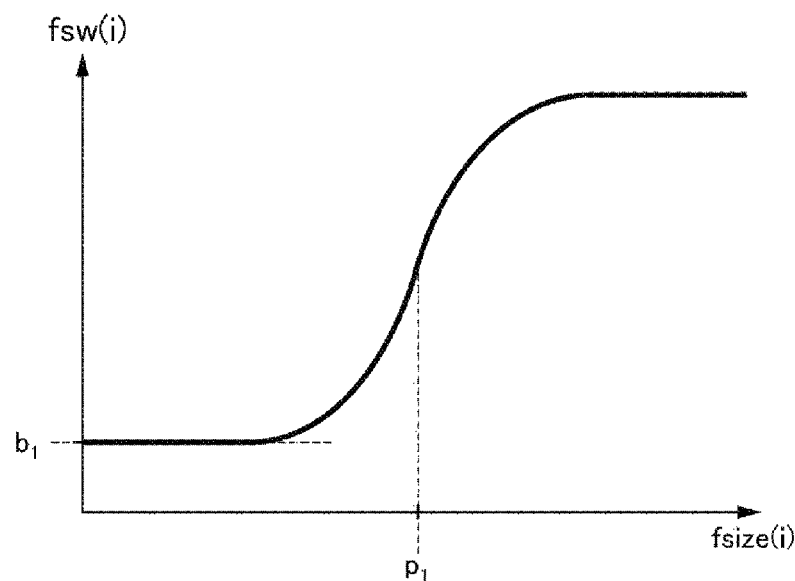
FIG. 10 is a graph describing modification of reliability by a size modulator.

FIG. 10 is a graph describing the modification of the reliability by the size modulator 61 of FIG. 9.

The abscissa in FIG. 10 indicates the length of one side of the face area fsize(i) as the size of the ith face area; and the ordinate indicates the modified reliability fsw(i) of the ith face area.

As shown in FIG. 10, the modified reliability fsw(i) is expressed by the following formula (1) based on the length fsize(i) and the reliability before being modified a(i) of the ith face area.

Formula (1)

$$fsw(i) = b_1 + a(i) \times \frac{1}{1 + e^{-w_1(fsize(i) - p_1)}} \tag{1}$$

wherein $b_1$, $p_1$ and $w_1$ are predetermined parameters.

According to the formula (1), basically, the reliability a(i) would be modified into the reliability fsw(i) in such a manner that the greater the length fsize(i) is, the greater the reliability fsw(i) becomes.

(Description of Modification of Reliability by Position Modulator)

Figure 11:
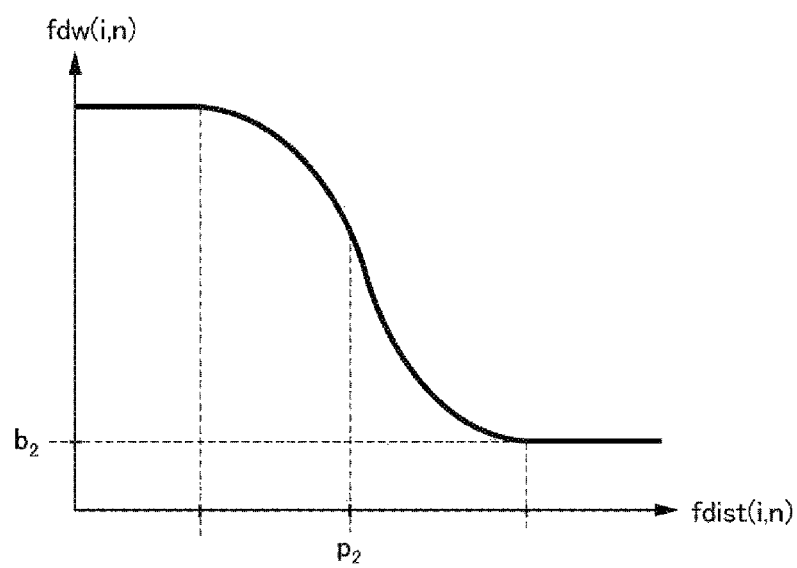
FIG. 11 is a graph describing modification of reliability by a position modulator.

FIG. 11 is a graph describing the modification of the reliability by the position modulator 62 of FIG. 9.

The abscissa in FIG. 11 indicates the distance fdist(i,n) between the location of the center of the ith face area on the image (fx_i, fy_i) and a location of the center of the nth pixel on the image (fx_n, fy_n); and the ordinate indicates the modified reliability fdw(i,n) with respect to the nth pixel of the ith face area.

As shown in FIG. 11, the modified reliability fdw(i,n) is expressed by the following formula (2) based on the distance fdist(i,n) and the reliability before being modified a(i) of the ith face area.

Formula (2)

$$fdw(i, n) = b_2 + a(i) \times \frac{1}{1 + e^{w_2(fdist(i,n) - p_2)}} \quad (2)$$

wherein $b_2$, $p_2$ and $w_2$ are predetermined parameters.

According to the formula (2), basically, the reliability a(i) would be modified into the reliability fdw(i,n) in such a manner that the shorter the distance fdist(i,n) is, the greater the reliability fdw(i,n) becomes.

Figure 12:
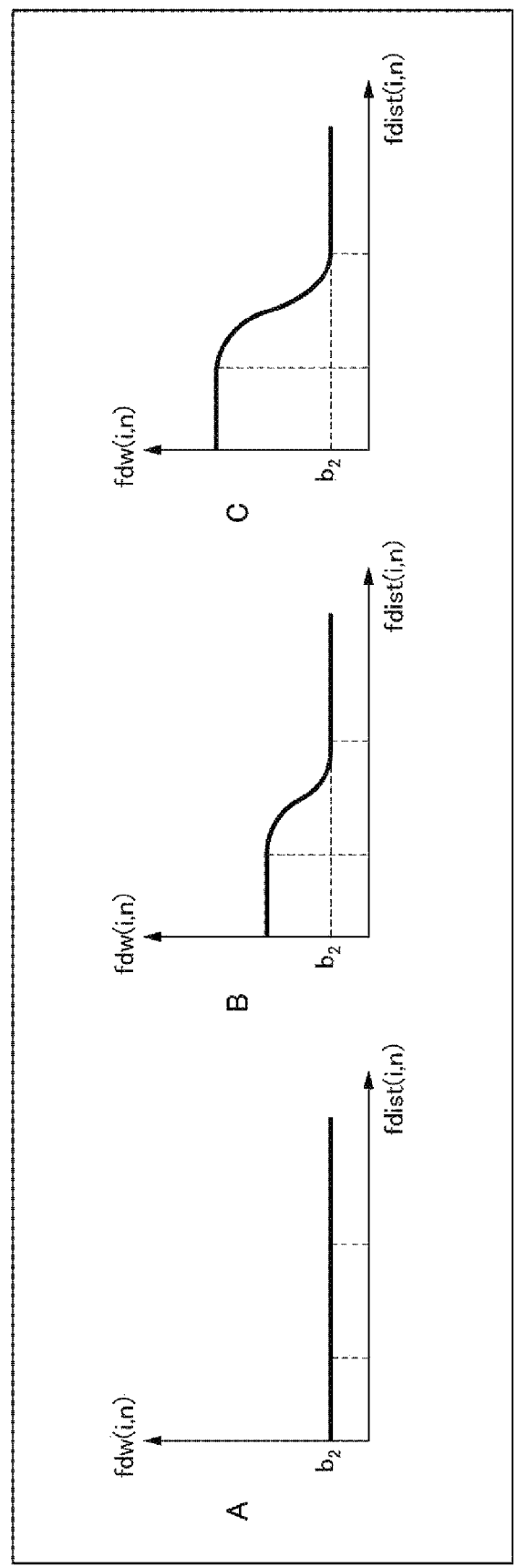
FIG. 12 shows some graphs describing changes in the modified reliability fdw(i,n) corresponding to each reliability a(i) before being modified.

FIG. 12 shows some graphs describing changes in the modified reliability fdw(i,n) corresponding to each reliability a(i) before being modified.

The abscissae of the graphs A to C in FIG. 12 indicate the distance fdist(i,n); and the ordinates indicate the modified reliability fdw(i,n).

As shown in A of FIG. 12, if the reliability a(i) before being modified is 0, the modified reliability fdw(i,n) is $b_2$ regardless of the distance fdist(i,n). As shown in B of FIG. 12, if the reliability a(i) before being modified is more than 0 and less than 1, basically, the shorter the distance fdist(i,n) is, the greater the modified reliability fdw(i,n) is. The greater the reliability a(i) before being modified is, the greater the maximum value of the modified reliability fdw(i,n) is.

As shown in C of FIG. 12, if the reliability a(i) before being modified is 1, basically, the shorter the distance fdist(i,n) is, the greater the modified reliability fdw(i,n) is. The maximum value of this modified reliability fdw(i,n) would be the largest.

(Example of Strength)

Figure 13:
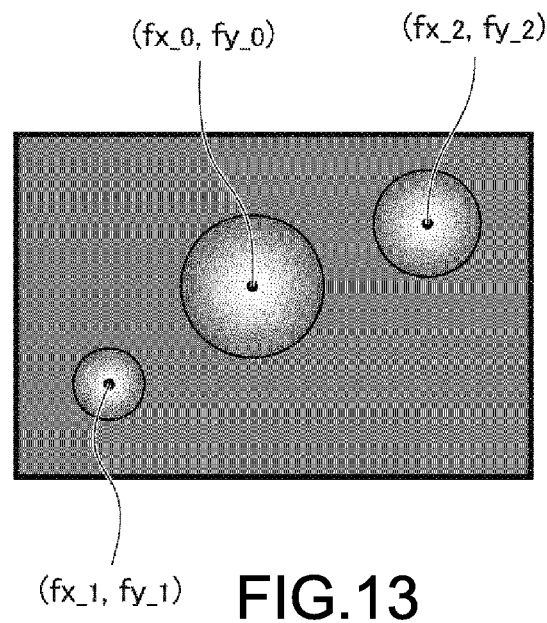
FIG. 13 shows an example of strengths for the respective pixels in the image of FIG. 2.

FIG. 13 shows an example of strengths for the respective pixels in the image 40 of FIG. 2.

Note that a darker color in FIG. 13 indicates lower strength and a lighter color indicates higher strength.

The calculation unit 63 first multiplies the reliability fsw(i) by the reliability fdw(i,n) per face area, as expressed by the following formula (3), to determine reliability S(i,n) per face area for each of the pixels.

Formula (3):

$$S(i,n) = fsw(i) \times fdw(i,n) \quad (3)$$

Then, the calculation unit 63 determines the largest reliability S(i,n), among the values of reliability S(i,n) for the respective face areas, as the strength ST(i), per pixel.

As a result, the strengths for the respective pixels in the image 40 including the face areas 41 to 43 shown in FIG. 2 are as indicated in FIG. 13. That is, the strength becomes lower as the distance from each location of the center of the face areas 41 to 43 of (fx_0, fy_0), (fx_1, fy_1) and (fx_2, fy_2) becomes longer. Further, since the size becomes smaller in the order of the face area 41, the face area 43, and the face area 42, the strength becomes lower in the order of the locations of (fx_0, fy_0), (fx_2, fy_2), and (fx_1, fy_1).

Note that in cases where not a single face area is output from the reliability determination unit 21, the strength determination unit 23 determines the strength assuming that the reliability a(i) is 0. Thus, the strength of all of the pixels would be $b_1 \times b_2$.

(Configuration Example of NR Processor)

Figure 14:
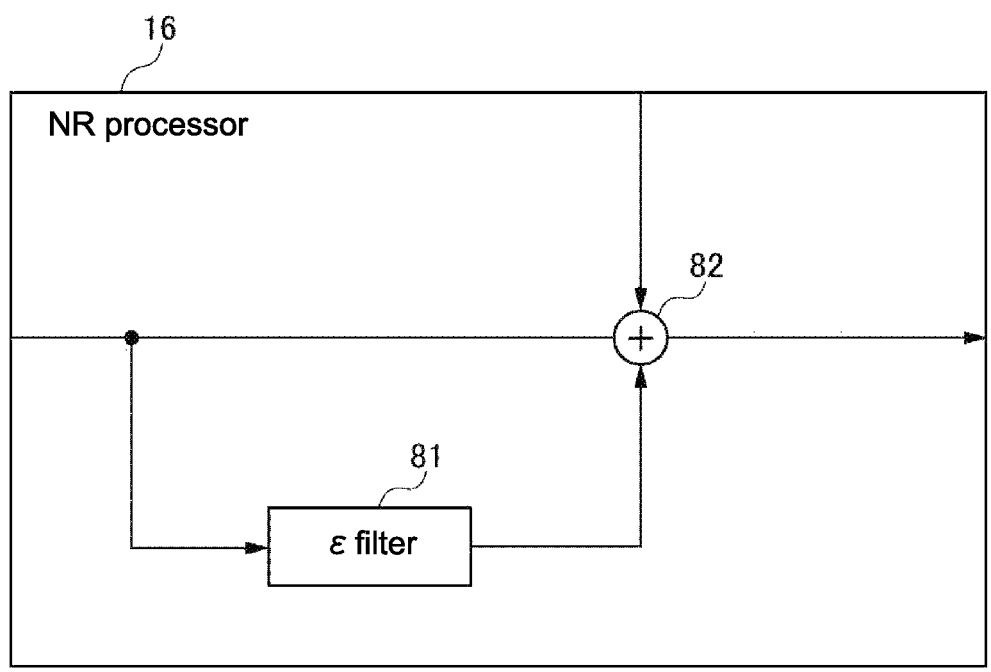
FIG. 14 is a block diagram showing a configuration example of a NR processor.

FIG. 14 is a block diagram showing a configuration example of the NR processor 16 of FIG. 1.

The NR processor 16 of FIG. 14 includes an ∊-filter 81 and a composition unit 82.

The ∊-filter 81 of the NR processor 16 functions as the noise-reduction processor. The ∊-filter 81 performs ∊-filter processing, as the noise-reduction processing, on the image being provided from the resizing unit 15 of FIG. 1. Specifically, for example, the ∊-filter 81 regards each pixel in the image as a pixel of interest. Then, for all the pixels surrounding the pixel of interest (hereinafter referred to as "surrounding pixels"), which pixels are included in a block having the pixel of interest in its center, the ∊-filter 81 may calculate differences between a pixel value of the pixel of interest and pixel values of the surrounding pixels. The ∊-filter 81 determines, as a pixel value of the pixel of interest after ∊-filter processing, an average value of the pixel values of the surrounding pixels in which the absolute values of the respective above-mentioned differences are smaller than a predetermined ∊-value. The NR processor 16 provides the image after ∊-filter processing to the composition unit 82.

The composition unit 82 combines the image after the noise-reduction processing being provided from the NR processor 16 and the image before the noise-reduction processing being provided from the resizing processor 15, per pixel, on the basis of the strength being provided from the strength determination unit 23. Specifically, the composition unit 82 may combine by the following formula (4), for each pixel, a pixel value IN of the image before the noise-reduction processing being provided from the resizing processor 15 with a pixel value LOW of the image after the noise-reduction processing being provided from the NR processor 16, on the basis of strength ST(n).

Formula (4):

$$OUT = (1 - ST(n)) \times IN + ST(n) \times LOW \quad (4)$$

The composition unit 82 provides, to the coding/decoding unit 17, the image made up of the pixel values OUT of the respective pixels being obtained from the result of combining. The composition unit 82 also provides the image via the bus 25 to the display 19.

Note that although the ∊-filter processing is performed as the noise-reduction processing in this embodiment, it is also possible that LPF (Low Pass Filter) processing, median filter processing, Laplacian filter processing or the like may be performed.

(Description of Processing by Image Processing Apparatus)

Figure 15:
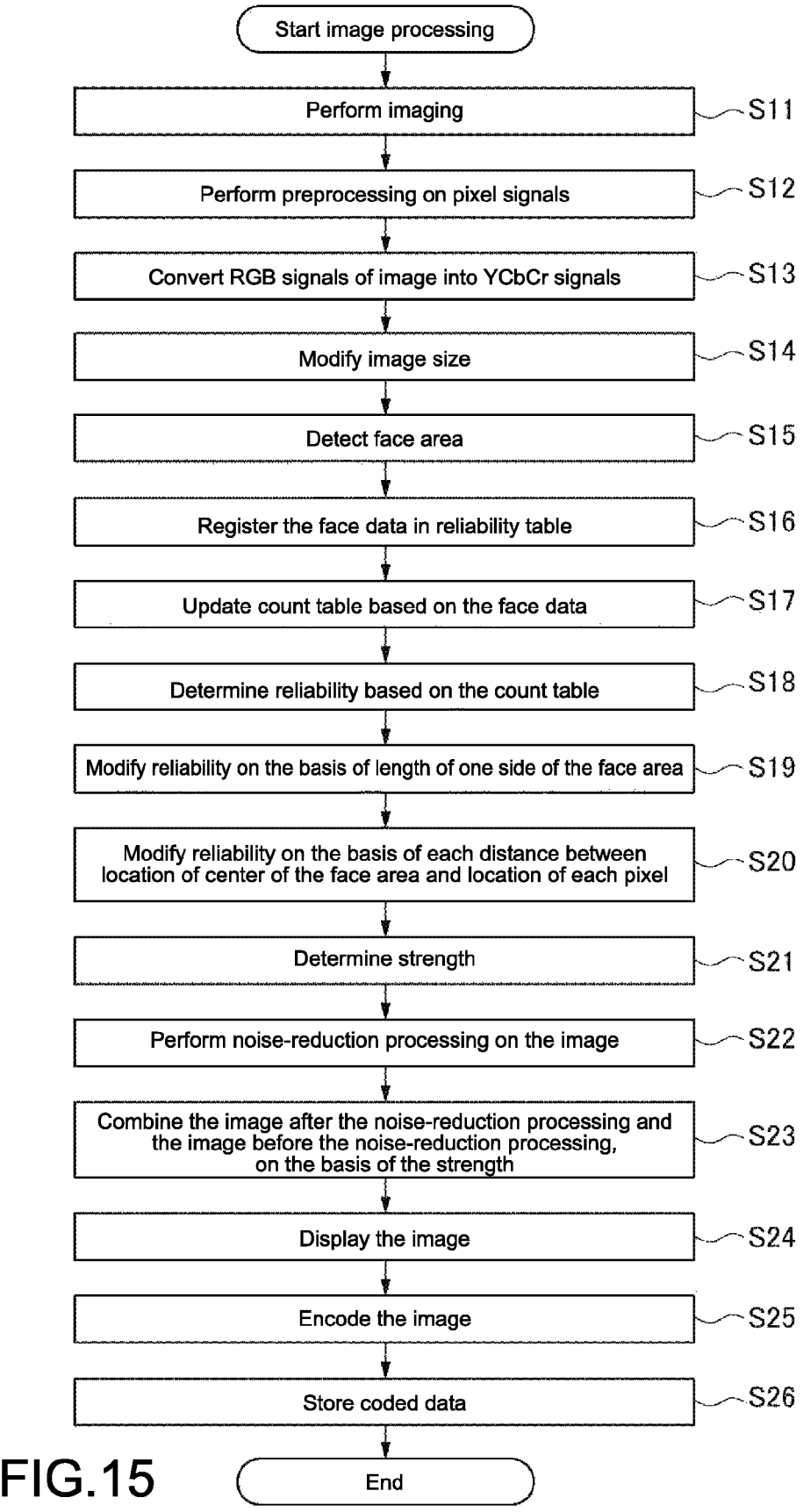
FIG. 15 is a flowchart describing image processing by the image processing apparatus.

FIG. 15 is a flowchart describing image processing by the image processing apparatus 10 of FIG. 1.

In step S11 of FIG. 15, the solid state image sensor 12 of the image processing apparatus 10 performs imaging by accumulating, in each pixel, electric charges depending on the amount of the incident light from the subject, which is imaged onto the imaging surface through the optical system 11. The solid state image sensor 12 provides, as pixel signals, analog signals of the electric charges that have been accumulated to the respective pixels as a result of imaging, to the preprocessor 13.

In step S12, the preprocessor 13 performs preprocessing such as A/D conversion and demosaicing on the pixel signals provided from the solid state image sensor 12, to generate image RGB signals. The preprocessor 13 provides the image RGB signals to the YC converter 14.

In step S13, the YC converter 14 converts the image RGB signals provided from the preprocessor 13 into YCbCr signals, and provides the YCbCr signals to the resizing processor 15.

In step S14, the resizing processor 15 modifies the size of the image (YCbCr signals) provided from the YC converter 14 into a predetermined size, and provides the image to the NR processor 16 and the face detection unit 20.

In step S15, the face detection unit 20 detects a face area in the image provided from the resizing processor 15. The face detection unit 20 provides, as face data, a location of the center of the detected face area on the image, a size of the face area, and the name corresponding to the face contained in the face area, to the reliability determination unit 21.

In step S16, the reliability determination unit 21 registers the face data being provided from the face detection unit 20, in the reliability table.

In step S17, the reliability determination unit 21 updates the count table recorded in the database 22, based on the face data provided from the face detection unit 20, which count table associates the name corresponding to the face area and the count value corresponding thereto.

In step S18, the reliability determination unit 21 determines the reliability a(i) for each face area corresponding to the name in the count table, in accordance with the count value corresponding thereto, based on the count table recorded in the database 22. The reliability determination unit 21 registers the reliability a(i) corresponding to the face data, in association with the face data recorded in the reliability table. The reliability determination unit 21 provides the face data and the reliability a(i), which are recorded in the reliability table, to the strength determination unit 23.

In step S19, the size modulator 61 of the strength determination unit 23 (see FIG. 9) modifies the reliability a(i) provided from the reliability determination unit 21, per face area, on the basis of length of one side fsize(i) of the face area which is contained in the face data provided from the reliability determination unit 21. The size modulator 61 provides the modified reliability fsw(i) for each face area to the calculation unit 63.

In step S20, the position modulator 62 modifies the reliability a(i) being provided from the reliability determination unit 21, for each face area, on the basis of the distance fdist(i,n) between the location of the center of the face area on the image (fx_i, fy_i) and a location of each pixel (fx_n, fy_n). The position modulator 62 provides the modified reliability fdw(i,n) per face area and per pixel, to the calculation unit 63.

In step S21, the calculation unit 63 multiplies the reliability fsw(i) by the reliability fdw(i,n) of each pixel, to generate the reliability S(i,n), for each face area. Then, the calculation unit 63 determines the largest reliability S(i,n), among the values of reliability S(i,n) for the respective face areas, as the strength ST(i), per pixel. The calculation unit 63 provides the strength ST(i) to the NR processor 16.

In step S22, the ε-filter 81 of the NR processor 16 (see FIG. 14) performs ε-filter processing, as the noise-reduction processing, on the image being provided from the resizing unit 15. The NR processor 16 provides the image after ε-filter processing to the composition unit 82.

In step S23, the composition unit 82 combines the image after noise-reduction provided from the NR processor 16 and the image before noise-reduction provided from the resizing processor 15, on the basis of the strength ST(i) being provided from the strength determination unit 23. The composition unit 82 provides the image being obtained from the result of combining, to the coding/decoding unit 17. The composition unit 82 also provides the image via the bus 25 to the display 19.

In step S24, the display 19 displays the image being provided from the composition unit 82. In step S25, the coding/decoding unit 17 encodes the image provided from the composition unit 82 and provides the resulting coded data to the storage 18.

In step S26, the storage 18 stores the coded data provided from the coding/decoding unit 17. Then, the processing is ended.

As described above, the image processing apparatus 10 determines the strength of noise-reduction processing on the basis of the distance between the location of the face area and the location of each pixel, and thus it is able to perform noise-reduction processing on the image at suitable strength corresponding to the distance from the face area. As a result, it becomes possible to reduce further the noises of the face areas and their surrounding areas, for which areas a person may usually be sensitive to image quality. Besides, it is possible to prevent image degradation due to the noise-reduction processing of areas for which a person may be less sensitive to image quality, which areas are distant from the face areas.

In addition, the image processing apparatus 10 is configured to, if the face area is detected, increment the reliability a(i) by a given value; and if the face area becomes undetected, decrement the reliability a(i) by a given value. Thus, it is possible to prevent an occurrence of rapid change in the strength ST(n) corresponding to the reliability a(i). As a result, it becomes possible to prevent rapid change in noisiness of the image after the noise-reduction processing, which provides enhanced image quality.

Furthermore, since the image processing apparatus 10 can determine the strength of noise-reduction processing based on the size of the face area, it is able to perform the noise-reduction processing on the image at the strength suitable for the size of the face area. As a result, it becomes possible to reduce further the noises of relatively large face areas, for which areas a person may usually be more sensitive to image quality. Besides, it is possible to prevent image degradation due to the noise-reduction processing of relatively small face areas, for which areas a person may be less sensitive to image quality.

Second Embodiment (Description of Computer to which the Present Disclosure is Applied)

The above series of processing may be executed not only by hardware but by software. When the series of processing is executed by software, a program constituting the software is installed in a computer. Here, the examples of the computer include a computer incorporated in dedicated hardware and a general-purpose personal computer capable of executing various functions with various programs installed therein.

Figure 16:
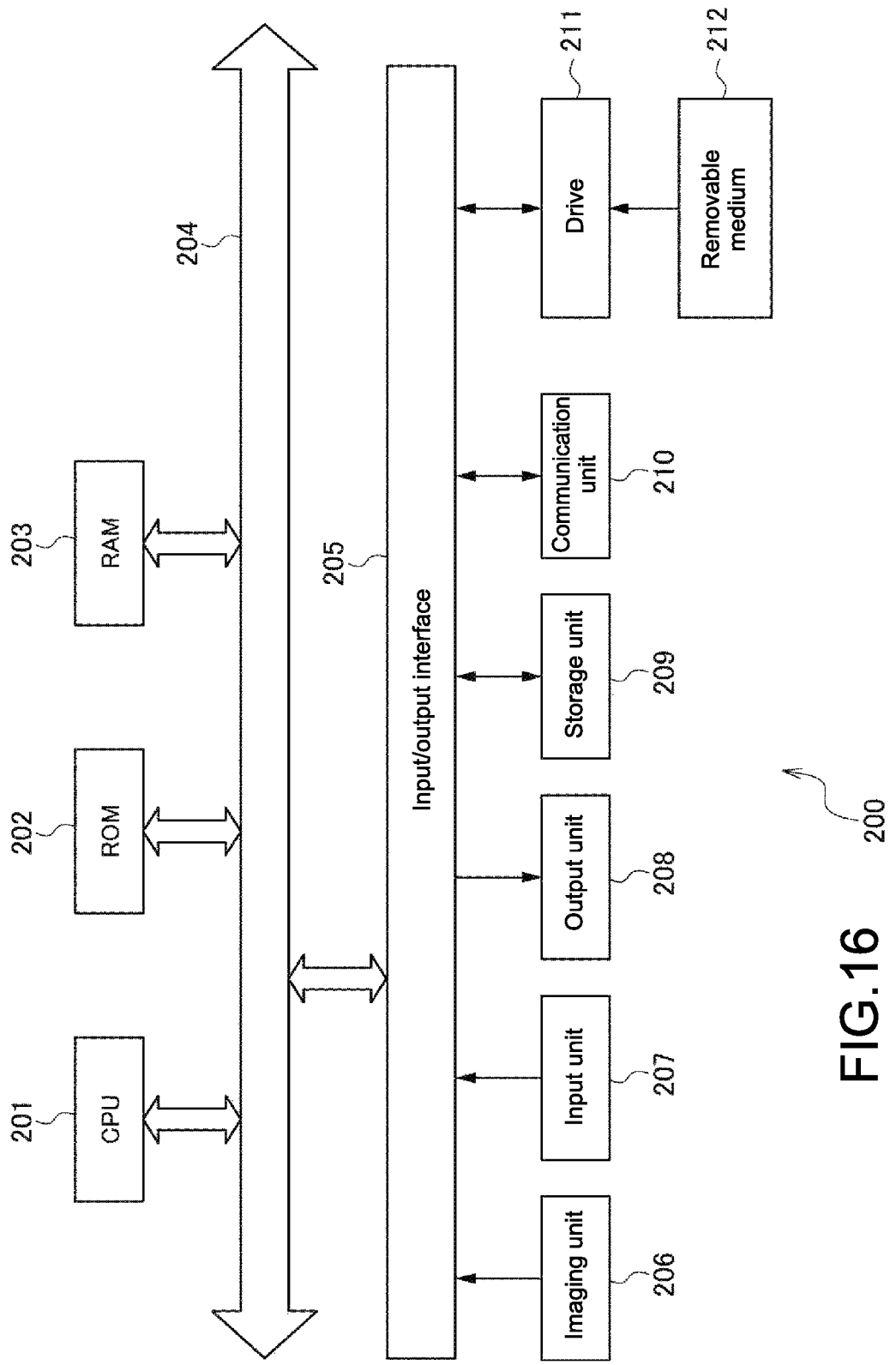
FIG. 16 is a block diagram showing a configuration example of the hardware of a computer.

FIG. 16 is a block diagram showing a configuration example of the hardware of a computer that executes the above series of processing with a program.

In a computer 200, a CPU (Central Processing Unit) 201, a ROM (Read Only Memory) 202, and a RAM (Random Access Memory) 203 are connected to one another by a bus 204.

The bus 204 is also connected to an input/output interface 205. The input/output interface 205 is connected to an imaging unit 206, an input unit 207, an output unit 208, a storage unit 209, a communication unit 210 and a drive 211.

The imaging unit 206 includes an optical system, a solid-state image sensor, and the like. The imaging unit 206 is operable to take an image. The input unit 207 includes a keyboard, a mouse, a microphone, or the like. The output unit 208 includes a display, a speaker, or the like. The storage unit 209 includes a hard disk drive, a non-volatile memory, or the like. The communication unit 210 includes a network interface or the like. The drive 211 drives a removable medium 212 such as a magnetic disk, an optical disk, a magnet-optical disk, and a semiconductor memory.

In the computer 200 thus configured, the above series of processing is executed, for example, when the CPU 201 loads a program stored in the storage unit 209 into the RAM 203 and executes the same via the input/output interface 205 and the bus 204.

For example, the program to be executed by the computer 200 (CPU 201) may be provided in a state of being recorded on the removable medium 212 serving as a package medium or the like. In addition, the program may be provided via a wired or wireless transmission medium such as a local area network, the Internet, and digital satellite broadcasting.

In the computer 200, the program may be installed in the storage unit 209 via the input/output interface 205 when the removable medium 212 is attached to the drive 211. In addition, the program may be received by the communication unit 210 via a wired or wireless transmission medium and installed in the storage unit 209. Besides, the program may be installed in advance in the ROM 202 or the storage unit 209.

Note that the program to be executed by the computer 200 may be a program to be executed chronologically in the order described in the specification or may be a program to be executed in parallel or at adequate timing such as when the program is invoked.

It should be noted that the effects described herein are non-limitative examples, and there may be other effects.

In addition, the embodiments of the present disclosure are not limited to the aforementioned embodiments, and various modifications are available within the scope without departing from the gist of the present disclosure.

For example, it is also possible that the image processing apparatus 10 may detect some areas other than face areas as well (e.g., area of an image of a dog, a cat, a general object (such as a car), etc.). The image processing apparatus 10 may determine also the strength of processing other than noise-reduction processing (e.g., edge-enhancement processing, contrast enhancement processing, color reproduction processing, etc.).

It is also possible that the face area to be detected may be in a shape other than a square shape. The unit of processing of the noise-reduction may be a unit of block which includes a plurality of pixels, instead of a unit of pixel.

Furthermore, the present disclosure may have the configuration of cloud computing in which a function is shared and cooperatively processed by a plurality of apparatuses via a network.

In addition, each of the steps described in the above flowchart may be executed not only by an apparatus but also shared and executed by a plurality of apparatuses.

Moreover, when a step includes a plurality of processing, the plurality of processing included in the step may be executed not only by an apparatus but also shared and executed by a plurality of apparatuses.

The present disclosure may employ, for example, the following configurations.

(1) An image processing apparatus, including:
a detection unit configured to detect at least one area in an image;
a strength determination unit configured to determine strength of processing for a unit of processing of the image, based on a distance between a location of the area being detected by the detection unit and a location of the unit of processing of the image; and
a processor configured to perform the processing on the image, per the unit of processing, at the strength being determined by the strength determination unit.

(2) The image processing apparatus according to (1), in which
the strength determination unit is configured to, if a plurality of areas are detected as the at least one area by the detection unit, determine strengths for the respective areas and determine the largest strength among the strengths as the conclusive strength.

(3) The image processing apparatus according to (1) or (2), in which
the strength determination unit is configured to determine the strength on the basis of the distance and a size of the area.

(4) The image processing apparatus according to any one of (1) to (3), further including
a reliability determination unit configured to determine reliability for the area on the basis of a history of detection of the area by the detection unit;
in which,
the strength determination unit is configured to determine the strength on the basis of the distance and the reliability being determined by the reliability determination unit.

(5) The image processing apparatus according to (4), in which
the reliability determination unit is configured to,
if the area is detected by the detection unit, increment the reliability by a given value, and
if the area becomes undetected by the detection unit, decrement the reliability by a given value.

(6) The image processing apparatus according to any one of (1) to (5), in which
the processing is noise-reduction processing.

(7) The image processing apparatus according to (6), in which
the processor includes
a noise-reduction processor configured to perform the noise-reduction processing on the image, and
a composition unit configured to combine the image after the noise-reduction processing by the noise-reduction processor and the image before the noise-reduction processing, per the unit of processing, on the basis of the strength.

(8) The image processing apparatus according to any one of (1) to (7), in which
the area is a face area.

(9) An image processing method including:
detecting at least one area in an image by an image processing apparatus;
determining strength of processing for a unit of processing of the image, based on a distance between a location of the area being detected by a process of the detecting and a location of the unit of processing of the image; and processing the image, per the unit of processing, at the strength being determined by a process of the determining the strength.

(10) A program to cause a computer to function as:
a detection unit to detect at least one area in an image;
a strength determination unit to determine strength of processing for a unit of processing of the image, based on a distance between a location of the area being detected by the detection unit and a location of the unit of processing of the image; and
a processor to perform the processing on the image, per the unit of processing, at the strength being determined by the strength determination unit.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a detection unit configured to detect at least one area in an image;
   a strength determination unit configured to determine strength of processing for a unit of processing of the image, based on a distance between a location of a center of the area being detected by the detection unit and a location of the unit of processing of the image;
   a processor configured to perform the processing on the image, per the unit of processing, at the strength being determined by the strength determination unit; and
   a reliability determination unit configured to determine reliability for the area on the basis of a history of detection of the area by the detection unit,
   wherein the strength determination unit is configured to determine the strength on the basis of the distance and the determined reliability for the area.

2. The image processing apparatus according to claim 1, wherein
   the strength determination unit is configured to, if a plurality of areas are detected as the at least one area by the detection unit, determine strengths for the respective areas and determine the largest strength among the strengths as a conclusive strength at which the processor is configured to perform the processing on the image, per the unit of processing.

3. The image processing apparatus according to claim 1, wherein the strength determination unit is configured to determine the strength on the basis of the distance and a size of the area.

4. The image processing apparatus according to claim 1, wherein the reliability determination unit is configured to,
   if the area is detected by the detection unit, increment the reliability by a given value, and
   if the area becomes undetected by the detection unit, decrement the reliability by a given value.

5. The image processing apparatus according to claim 1, wherein the processing is noise-reduction processing.

6. The image processing apparatus according to claim 5, in which the processor includes
   a noise-reduction processor configured to perform the noise-reduction processing on the image, and
   a composition unit configured to combine the image after the noise-reduction processing by the noise-reduction processor and the image before the noise-reduction processing, per the unit of processing, on the basis of the strength.

7. The image processing apparatus according to claim 1, in which the area is a face area.

8. An image processing method comprising:
   detecting at least one area in an image by an image processing apparatus;
   determining reliability for the area on the basis of a history of detection of the area by a detection unit of the image processing apparatus;
   determining strength of processing for a unit of processing of the image, based on a distance between a location of a center of the area being detected by a process of the detecting and a location of the unit of processing of the image; and
   processing the image, per the unit of processing, at the strength being determined by the step of determining the strength,
   wherein the strength is determined on the basis of the distance and the determined reliability for the area.

9. A non-transitory computer-readable storage medium having stored thereon instructions for causing a computer to function as:
   a detection unit to detect at least one area in an image;
   a strength determination unit to determine strength of processing for a unit of processing of the image, based on a distance between a location of a center of the area being detected by the detection unit and a location of the unit of processing of the image;
   a processor to perform the processing on the image, per the unit of processing, at the strength being determined by the strength determination unit; and
   a reliability determination unit to determine reliability for the area on the basis of a history of detection of the area by the detection unit,
   wherein the strength determination unit determines the strength on the basis of the distance and the determined reliability for the area.

10. An image processing apparatus, comprising:
    a detection unit configured to detect at least one area in an image;
    a strength determination unit configured to determine strength of processing for a unit of processing of the image, based on a distance between a location of a center of the area being detected by the detection unit and a location of the unit of processing of the image; and
    a processor configured to perform the processing on the image, per the unit of processing, at the strength being determined by the strength determination unit,
    wherein, if a plurality of areas are detected as the at least one area, strengths for the respective areas are determined and the largest strength among the strengths is determined as a conclusive strength at which the processing is performed on the image, per the unit of processing.

* * * * *